Feb. 19, 1952　　　E. C. DILL　　　2,586,310
BLOCKING OSCILLATOR
Filed Feb. 28, 1948

WITNESSES:
E. A. McCloskey
N. C. Groome

INVENTOR
Everett C. Dill.
BY F. W. Lyle.
ATTORNEY

Patented Feb. 19, 1952

2,586,310

UNITED STATES PATENT OFFICE 2,586,310

BLOCKING OSCILLATOR

Everett C. Dill, Arlington, S. Dak., assignor to Westinghouse Electric Corporation, East Pittsburgh, Pa., a corporation of Pennsylvania Application February 28, 1948, Serial No. 11,919

3 Claims. (Cl. 250—36)

My invention relates to harmonic generators employing electron tubes, and in particular relates to a set of circuit connections to enable electron tubes of the so-called blocking-oscillator type to generate periodic voltage pulses of extremely short duration.

For a number of different purposes now familiar in the field of high frequency electrical techniques, it is desirable to be able to generate voltage pulses, which may recur at intervals in the order of one-millionth of a second, and in which the voltage pulses themselves have an extremely short duration.

One example of such a purpose is in a device referred to by the name of a "harmonic generator," in which short pulses are produced at fixed intervals separated from each other by a substantially longer intervening period of zero signal. In a system of this type, the practice has been to employ what is known as a single swing blocking oscillator to generate the voltage pulses. If the voltage pulses occur at fixed intervals which we can denote as $f$, the harmonics available from such voltage pulses will be of the series $(2f+3f+4f+5f+ \ldots +nf)$, where $n$ is a whole integer. The value of $n$ being dependent on the slope of the leading edge of the pulse; hence the faster the voltage pulse increases, the higher will be whole integer denoted as $n$. It is obvious that if a pulse of extremely short duration is produced, it will of necessity have a leading edge which rises in value very fast and consequently a large $nf$ is produced. It can be also shown mathematically that the larger the $nf$, the more nearly constant are the amplitudes of the harmonics, which is advantageous in many applications of such devices. To produce the voltage pulses blocking oscillators of the conventional type using an electron tube having a primary winding connected in series with its anode, and having a resistor in series between its cathode. A source of alternating voltage is connected to the grid electrode through a capacitor in series with a secondary winding which is interlinked with the above-mentioned primary winding by an iron core. A tertiary winding, interlinked with the above-mentioned primary winding, is provided for obtaining useful output from the circuit.

When the above-mentioned alternating voltage is impressed on the circuit, the positive half-wave raises the control grid potential sufficiently so that current begins to flow from the anode through the above-mentioned primary winding. This winding is so poled relative to the first-mentioned secondary winding that the voltage induced in the latter tends to render the control grid still more positive, thereby causing a very rapid increase of current from the anode to the cathode of the tube. This effect is cumulative, increasing the positive potential of the grid still more until the current through the tube approaches the saturation point.

However, during the foregoing process a charge has been accumulating on the capacitor tending to make the control grid less positive and so to decrease current flow through the primary winding. Thus the voltage induced by the primary winding on the first-mentioned secondary winding falls to zero, thereby decreasing the positiveness of the grid potential which in turn results in a decrease in current flow in the primary winding and anode. This then reduces the voltage impressed by the secondary winding of the control electrode which decreases the current flowing through the primary winding and anode still more. Again the effect of the action is cumulative, and current flow from the anode source falls very quickly to zero.

The foregoing action has produced a charge on the capacitor in series with the control electrode which impresses negative potential on the latter so that once current flow has ceased it cannot recommence, notwithstanding any positive voltage impressed by the alternating input signal, until the capacitor has had time to discharge itself which it does through a shunting resistor. The time constant of the capacitor-resistor circuit is arranged so that the capacitor does not reach substantial discharge until after the end of the positive half-cycle of the alternating input voltage. The negative half-cycle of the input voltage of course has no tendency to render the electron tube conductive, and it is not until the beginning of the next half-cycle of the alternating input voltage that the electron tube is again rendered conductive to recommence the cycle of operation which has been described above.

By properly designing the relative magnitudes of the resistors, capacitors and transformer windings in ways well-known in the art, it is possible at 100 kc. to make the duration of the voltage pulse from anode to cathode of the electron tube extremely small relative to the periodicity of the alternating input voltage.

However, at 1 mc. it is impossible to use a conventional blocking oscillator as described above as the pulse widths are of greater length than a complete cycle of input voltage.

My invention is directed to a modification of the above described circuit. As the inductances of the transformer windings using an iron core are relatively high, I removed the iron core and designed the primary winding to have a natural frequency roughly 25 times higher than the input or triggering frequency. As the primary winding now had a high Q (losses normally obtained in the iron core load the circuit and thus destroy the Q), the blocking oscillator produced a damped signal having the natural frequency of its primary winding. To avoid this difficulty, I critically damp out the resonant effects of the primary winding by using unilaterally conducting devices in the circuits magnetically coupled to the primary winding.

One object of my invention is, accordingly, to produce an improved form of blocking oscillator generator.

Another object of my invention is to produce a generator of voltage pulses in which the intervals between voltage pulses are shorter than were possible through the use of prior art circuits.

Still another object of my invention is to produce a generator of voltage pulses which have an extremely short duration.

Still another object of my invention is to produce an improved type of generator of voltage pulses, of a type in which the duration of the individual voltage pulses is extremely short compared with the intervals which separate them.

Still another object of my invention is to produce a generator of voltage pulses which are of substantially shorter duration than those which were possible through the use of prior art circuits.

Other objects of my invention will become apparent upon reading the following description, taken in connection with the drawing, in which.

Figure 2:
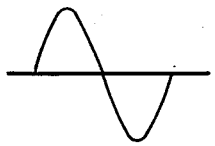
Fig. 2 is a graph showing the wave form of the alternating input voltage impressed on my pulse generator.

Referring in detail to the drawing, an electron tube 1 is shown as a pentode, but may be any type employing a control electrode, has its anode connected through a primary winding 2 to the positive terminal 3 of a direct current voltage source (not shown), the negative terminal of which is connected to the point 4, for example through ground. The cathode of the tube 1 is connected to the point 4 through a resistor 5. The screen grid of the tube 1 is connected to the point 4 through a by-pass capacitor 6 and through a resistor 7 to the positive terminal 3.

The control grid of the tube 1 is connected to the point 4 through a resistor 8. An input or control voltage which may be of a sinusoidal form illustrated in Fig. 2 is connected between point 4 and one terminal of a capacitor 9, the other terminal of which is connected to a point 4 through a resistor 11. The common terminal of the capacitor 9 and resistor 11 is connected to one end of a secondary winding 12 which is magnetically coupled to the primary winding 2. The other end of the secondary winding 12 is connected through a capacitor 13 to the control electrode of the tube 1 and to resistor 8. A unilaterally conducting device 14, which may, for example, be a crystal rectifier, is shunted across the terminals of the secondary winding 12. A tertiary winding 15 is magnetically coupled to winding 2 and has its terminals shunted by a unilaterally conducting device 16 which may be similar to the device 14. Winding 15 supplies current to the output circuit through a coaxial conductor having a core 17 and a grounded sheath 18. A terminating resistor 19 interconnects the ground with the terminus of the core 17 which is remote from the tertiary winding 15. This coaxial cable can be eliminated and winding 15 terminated directly to ground by resistor 19.

It is my opinion that the effect of the crystals 14 and 16 on the operation of the tube 1 may be explained somewhat as follows: When no alternating input voltage is impressed through the blocking capacitor 9, the tube 1 is adjusted to cut off so that no current flows between its anode and cathode. When the alternating input voltage is first impressed, the first positive half-cycle thereof will render the control electrode of tube 1 more positive so that current will begin to flow from its anode to its cathode through the primary winding 2. The secondary winding 12 is so poled that the voltage induced in it tends to render the control electrode of tube 1 more positive; in other words this induced voltage makes the lower end of the winding 12 in the drawing positive relative to the upper end. The polarity of the rectifier 14 is such that it is non-conductive to current flow responsive to such a voltage; and the polarity of the rectifier 16 is likewise such that the voltage simultaneously induced in the winding 15 can cause no current flow through crystal 16. Current thus flows through the blocking capacitor 9, secondary winding 12, capacitor 13 and resistor 8 making the control electrode of tube 1 positive, the induced voltage in winding 12 evidently aiding in this effect. This tends to further increase current flow from the anode to the cathode of tube 1, inducing a still further positive potential on the lower end of the winding 12 relative to its upper end, and thereby rendering the control electrode of tube 1 still more positive. This cumulative effect continues until current flow from anode to cathode of tube 1 approaches saturation, whereupon no further substantial increase of current through the winding 2 is possible.

During all of this time, a charge has been building up on the plates of the capacitor 13 rendering its lower plate negative and a condition soon arises when the potential of the control electrode of tube 1 begins to decrease instead of becoming more positive. This tends to decrease current flow from the anode of tube 1 through winding 2, and such current decrease through winding 2 tends to reverse the polarity of the voltage induced in winding 12 making the lower end of the latter negative relative to its upper end. This causes the control electrode of tube 1 to be less positive which in turn decreases the current from the anode to the cathode. The decrease in current in winding 2 induces a voltage in winding 12 which tends to make the control electrode of tube 1 still less positive. This cumulative effect continues until the tube is no longer conducting current at which time the condenser 13 is negatively charged. If it were not for the presence of the crystal 14, the voltage thus induced in the winding 12 might become very substantial, but the polarity of the crystals 14 is such that it begins to conduct current and prevents the inductance of the winding 12 from resonating with its distributed capacity to produce local voltage oscillations. In short, the crystal 14 may be said to damp any tendency of the winding 12 to produce resonant oscillations. Current through the winding 2 can then fall negative under the effect of the voltage charge in the capacitor 13 free from the disturbing effect of such local resonance voltage oscillations. Also as winding 12 is magnetically coupled to winding 2, the crystal 14 tends to damp local resonant voltage oscillations in winding 2.

Once current from the anode to cathode through tube 1 has fallen to zero, it remains at that value until the charge on capacitor 13 has time to leak away through resistors 8 and 11; and these circuit elements are so proportioned that the complete leakage of this charge does not occur until after the end of the first half-cycle of the positive voltage impressed by the input signal wave shown in Fig. 2.

Figure 3:
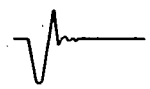
Fig. 3 is a graph showing the wave form at the output terminals of the electron tube circuit of Fig. 1.
Figure 1:
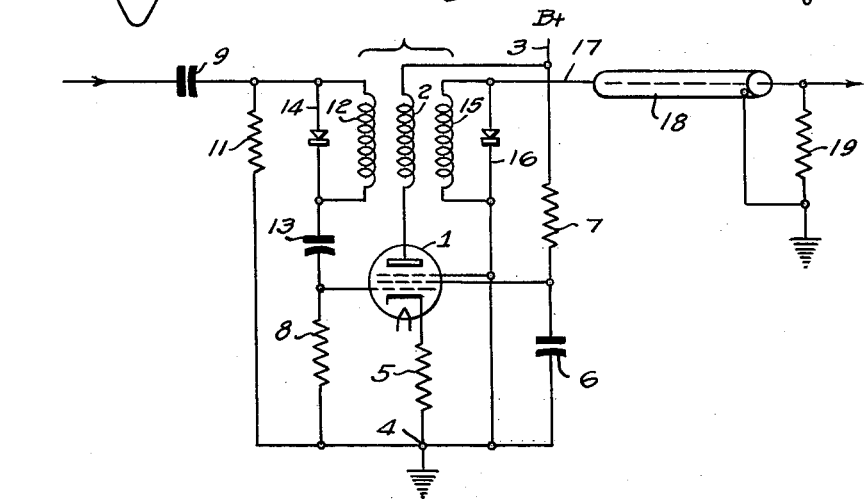
Figure 1 is a schematic diagram of the electrical circuit, which is a preferable embodiment of the principles of my invention.

It is then not until during the first positive half-cycle of the input voltage wave that the charge on capacitor 13 can disappear and the control electrode of tube 1 become positive enough to reinitiate current flow from the anode to cathode of tube 1, to be followed by a repetition of the cycle of events outlined above. Winding 2 induces a voltage into winding 15, and to prevent local resonant voltage oscillation, crystal 16 is used to critically damp the output winding 15. As winding 2 is magnetically coupled to winding 15, the crystal 16 also tends to damp any local resonant voltage oscillations in winding 2. The output voltage across resistor 19 is of the wave form shown in Fig. 3 and it may be supplied to suitable clipper circuits well known in the art to reduce it to a substantially rectangular flat top pulse.

Using the above-described circuit, I have found it possible to produce rectangular pulses occurring at intervals of 1 microsecond which have a pulse width of only one-fiftieth of a microsecond. While this was sufficiently short for the purposes in which I was interested at the moment, my work convinces me that it would be possible by further reduction of certain circuit constants to reduce the pulse length to one-hundredth of a microsecond or less without unstabilizing the operation of the device. The practical need for pulses of this short duration is evident from the consideration that in present distance determining devices employing square-topped voltage pulses of the type under discussion, a pulse width of one-tenth of a microsecond corresponds to 16.4 yards of distance, and this error could be reduced to 3.3 yards with something from one-fifth of the above-mentioned voltage pulses having a width of one-fiftieth of a microsecond.

Another notable need for pulses of such short duration is in radio transmitters where it is designed to obtain the primary frequency by combining the outputs of harmonic generators. Thus for a radio transmitter operating on a frequency of several megacycles to thirty megacycles a device such as a one megacycle harmonic generator is imperative in its signal determining circuits.

I claim as my invention:

1. In combination with an electrical discharge tube having an anode, a cathode and a control electrode, a primary winding in series with said anode, a secondary winding coupled to said primary winding and connected in series with a capacitor and said control electrode and a source of control voltage, a load circuit also coupled to said primary winding, and a unilaterally conductive device connected in shunt across the terminals of said secondary winding, the polarity of said unilaterally conductive device being such as to effectively short circuit said secondary winding when the voltage induced therein by said primary winding tends to impress a negative voltage upon said control electrode.

2. In combination with an electrical discharge tube having an anode, a cathode and a control electrode, a primary winding in series with said anode, a secondary winding coupled to said primary winding in series with a capacitor and said control electrode and a source of control voltage, a tertiary winding coupled to said primary winding, and a unilaterally conductive device coupled across the terminals of each of said secondary and said tertiary windings.

3. In combination with an electrical discharge tube having an anode, a cathode and a control electrode, a primary winding in series with said anode, a secondary winding coupled to said primary winding in series with a capacitor and said control electrode and a source of control voltage, a tertiary winding coupled to said primary winding, and a unilaterally conductive device coupled across the terminals of each of said secondary and said tertiary windings, the polarity of said unilaterally conductive devices being such as to effectively short circuit said secondary and tertiary windings when the voltages induced therein by said primary winding tend to impress a negative voltage upon said control electrode.

EVERETT C. DILL.

REFERENCES CITED

The following references are of record in the file of this patent:

UNITED STATES PATENTS

| Number | Name | Date |
|---|---|---|
| 2,227,075 | Geiger | Dec. 31, 1940 |
| 2,250,706 | Geiger | July 29, 1941 |
| 2,265,620 | Bahring | Dec. 9, 1941 |
| 2,308,908 | Bahring | Jan. 19, 1943 |

FOREIGN PATENTS

| Number | Country | Date |
|---|---|---|
| 750,044 | France | May 15, 1933 |